United States Patent [19]
Chawki et al.

[11] Patent Number: 5,576,875
[45] Date of Patent: Nov. 19, 1996

[54] TELECOMMUNICATIONS NETWORK ORGANIZED IN RECONFIGURABLE WAVELENGTH-DIVISION-MULTIPLEXED OPTICAL LOOPS

[75] Inventors: Mouhammad J. Chawki; Valérie Tholey, both of Lannion; Ivan Le Gac, Perros Guirec, all of France

[73] Assignee: France Telecom, Paris, France

[21] Appl. No.: 419,019

[22] Filed: Apr. 10, 1995

[30] Foreign Application Priority Data

Apr. 13, 1994 [FR] France ................................ 94 04394

[51] Int. Cl.⁶ .............................................. H04J 14/02
[52] U.S. Cl. ......................... 359/125; 359/119; 359/133; 359/167
[58] Field of Search ..................... 359/119, 123, 359/124, 125, 127, 133, 166, 167

[56] References Cited

FOREIGN PATENT DOCUMENTS 0496673  7/1992  European Pat. Off. ............... 359/125

OTHER PUBLICATIONS

A. F. Elrefaie, *Multiwavelength Survivable Ring Network Architectures*, IEEE International Conference on Communications, May 1993, pp. 1245–1251.

B. Glance, *Large–Capacity Local Access Network*, IEEE Photonics Technology Letters, Dec. 1993, pp. 1448–1451.

*Primary Examiner*—Leslie Pascal
*Attorney, Agent, or Firm*—Nilles & Nilles, S.C.

[57] ABSTRACT

In a telecommunications network organized in wavelength-division-multiplexed optical loops, each loop has tunable reception means tuned as a function of the density of the network traffic, thus being capable of being reconfigured as a function of requirements. The disclosed system can be applied to public, private and data communication networks.

19 Claims, 4 Drawing Sheets

FIG_1a
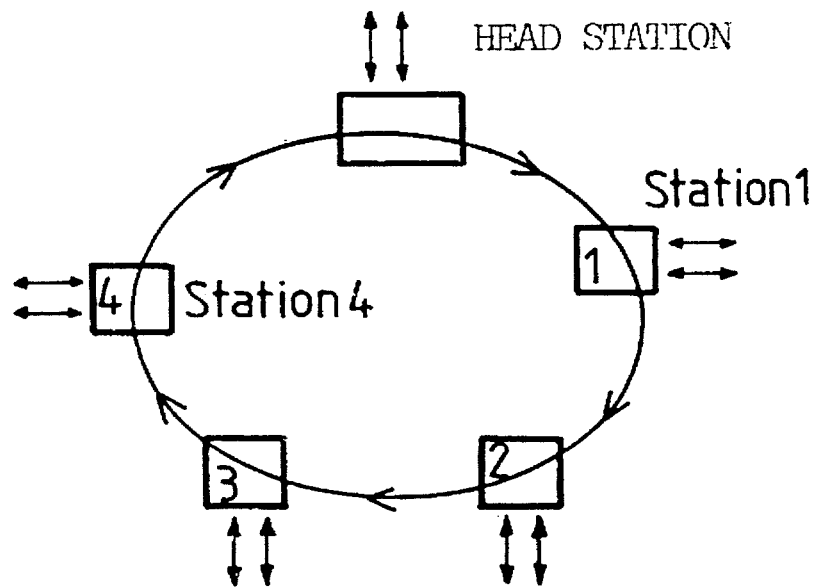
FIG_1b
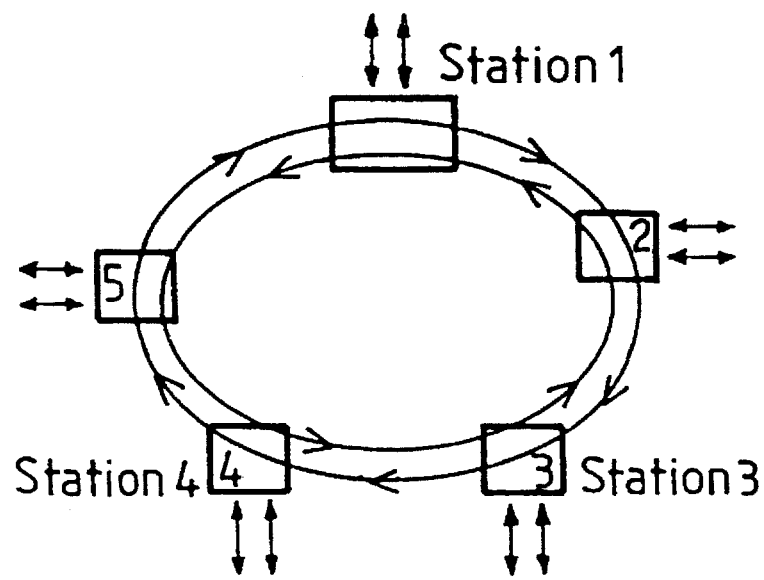

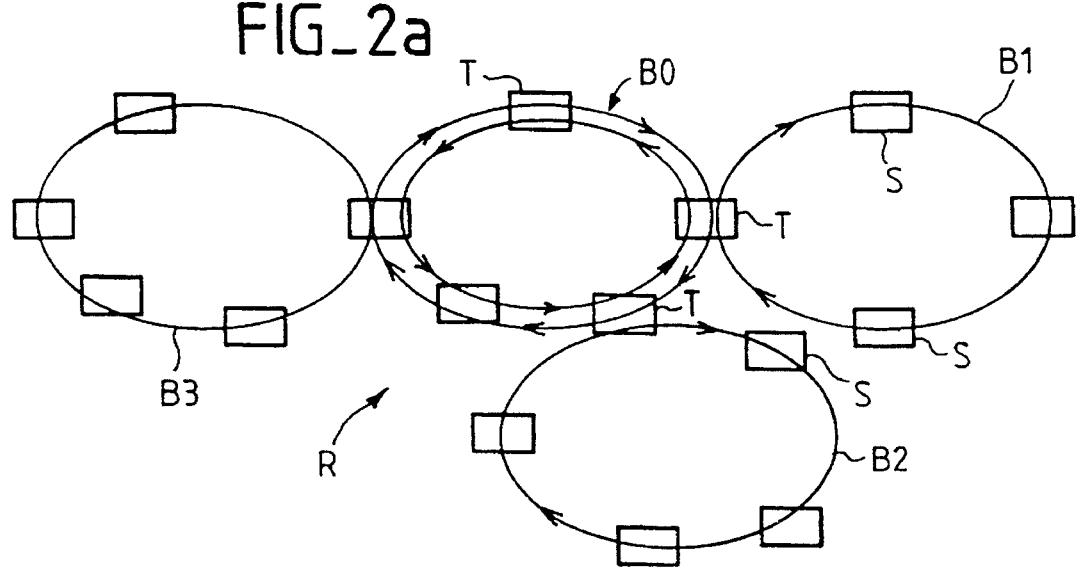
FIG_2a
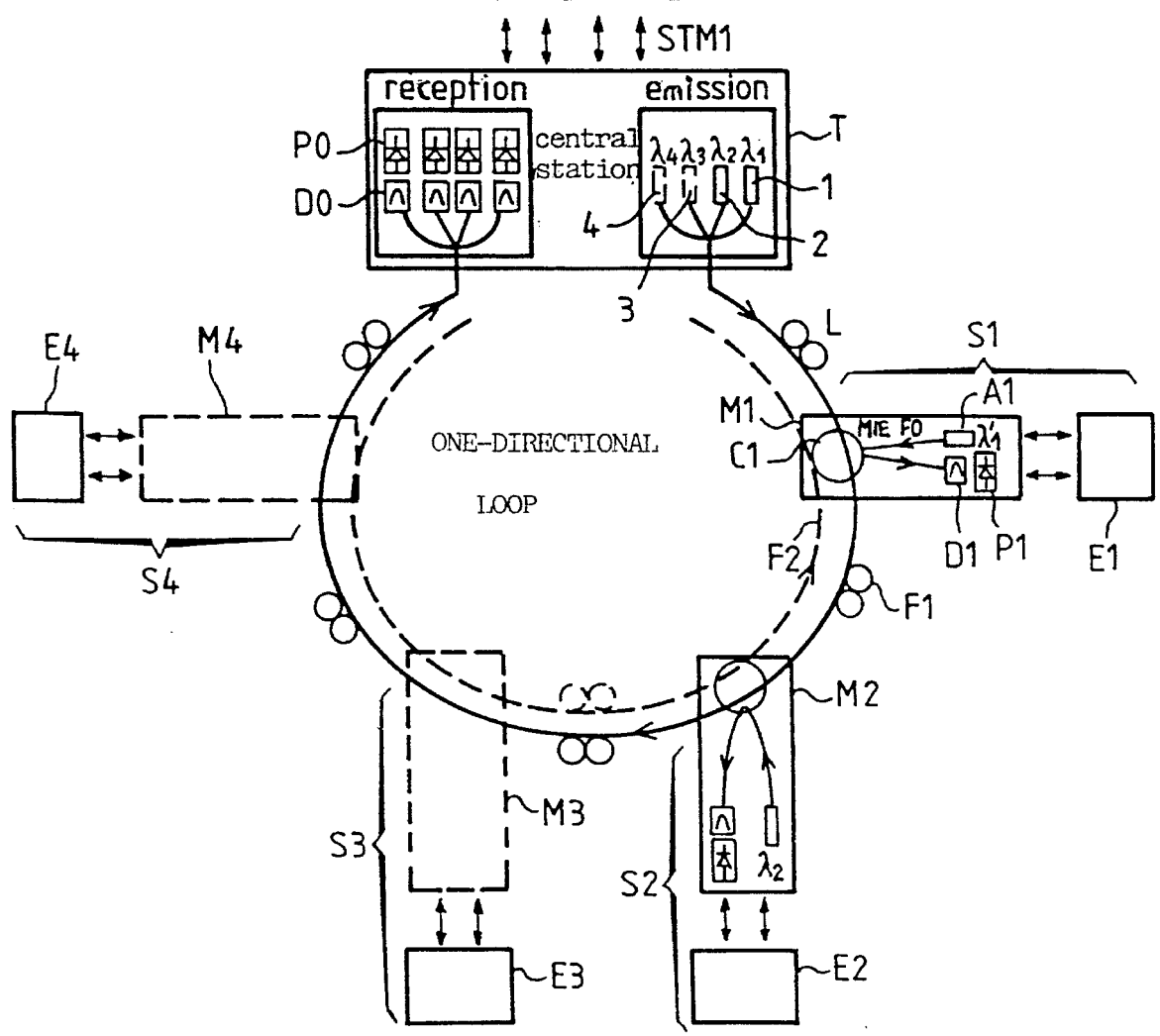
FIG_2b

FIG_3
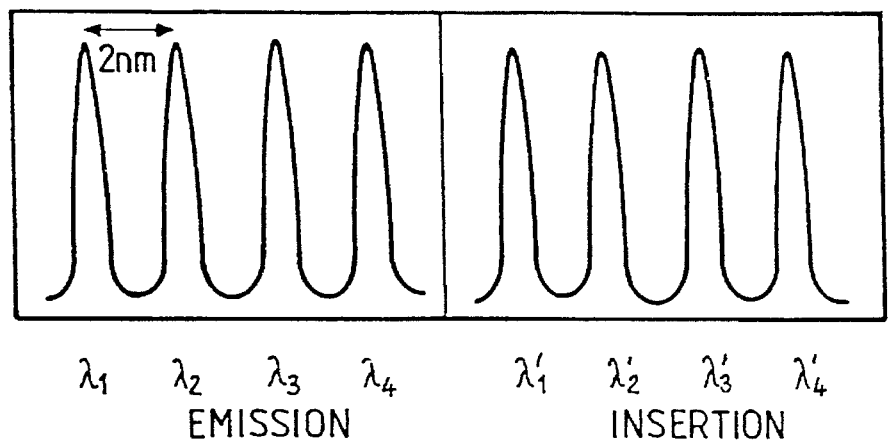
$\lambda_1$  $\lambda_2$  $\lambda_3$  $\lambda_4$   $\lambda'_1$  $\lambda'_2$  $\lambda'_3$  $\lambda'_4$
EMISSION             INSERTION
FIG_4a
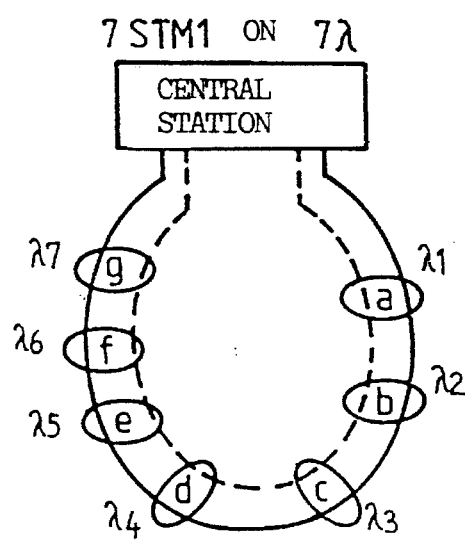
a) 1$\lambda$ by station
FIG_4b
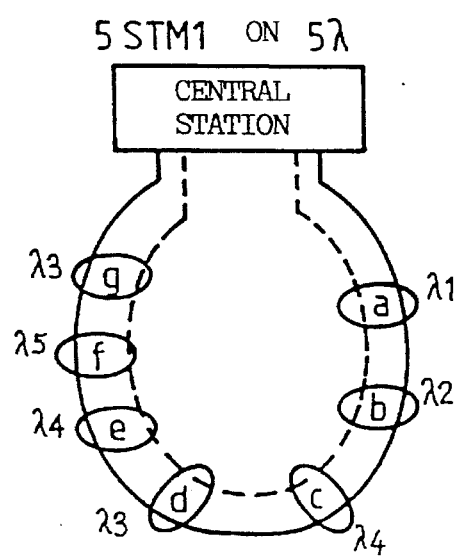
b) Share of $\lambda$ between stations

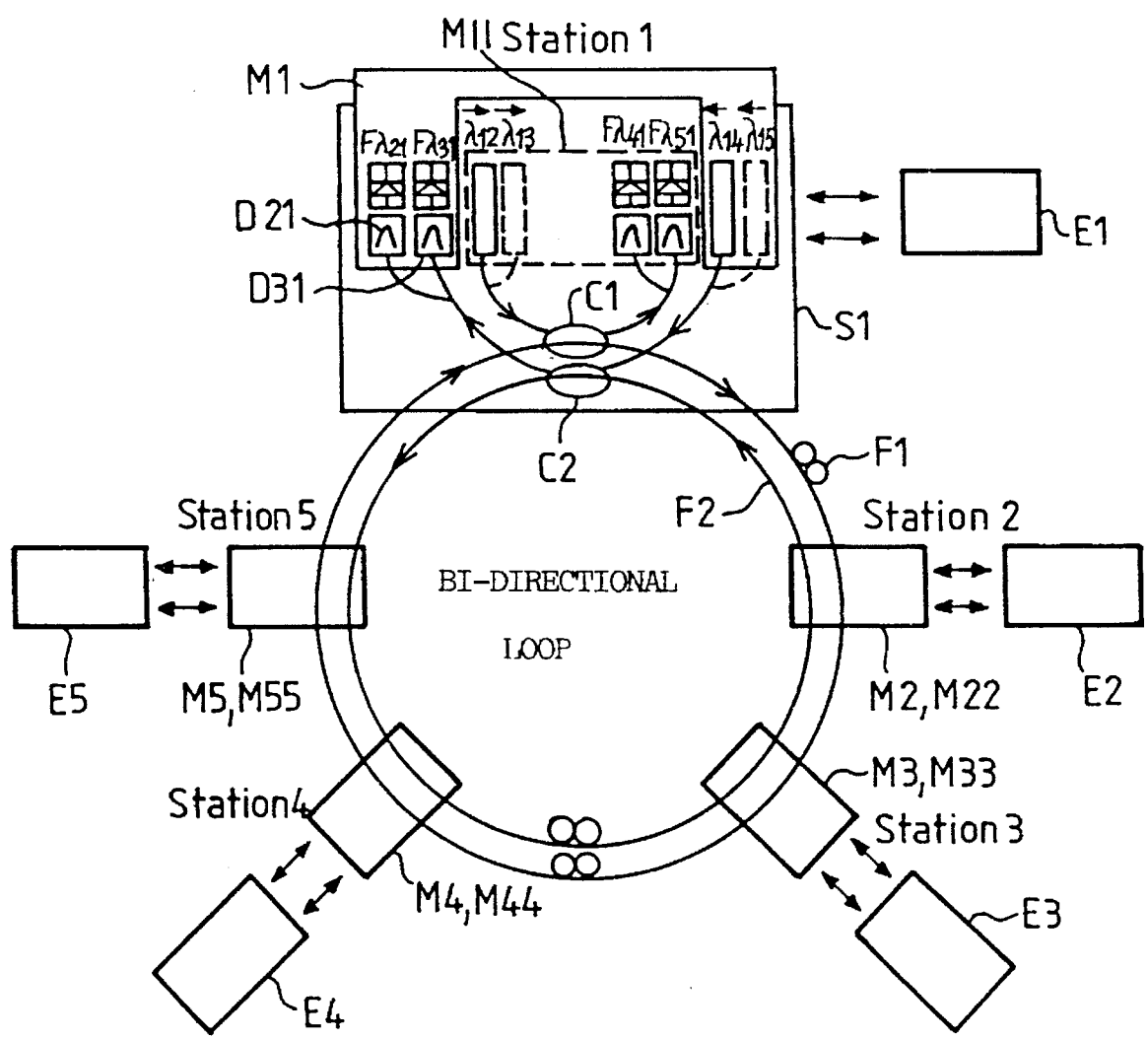

TELECOMMUNICATIONS NETWORK ORGANIZED IN RECONFIGURABLE WAVELENGTH-DIVISION-MULTIPLEXED OPTICAL LOOPS

BACKGROUND OF THE INVENTION

The invention relates to a telecommunications network organized in wavelength-division-multiplexed optical loops. It can be applied to any type of telecommunications network, namely to public or private transmission networks. Thus, it can be applied to the national and regional telecommunications networks, local networks, and data communication networks.

In the field of telecommunications, the term "optical loop" refers to a set of stations connected to one another by one or more optical fibers constituting the means for conveying information from one station to another. These stations form variable traffic nodes. The term "wavelength-division-multiplexed optical loop" refers to an information transfer loop wherein a station transmits information elements to another station of the loop on a given wavelength assigned to this station, each station having a predetermined reception wavelength.

SDH (Synchronous Digital Hierarchy) networks using transmission on optical fibers are organized in loops which may have two types of architecture, a one-directional architecture as shown schematically in FIG. 1a or a bi-directional architecture as shown schematically in FIG. 1b.

The one-directional loop (FIG. 1a) has a station at the "head" of the network connected to several stations in a clearly defined direction. Each station can extract the information elements intended for it and insert other information elements which will be transmitted to the head of the network. The insertion/extraction or add/drop function is achieved by an add/drop multiplexer (ADM).

The bi-directional loop (FIG. 1b) is distinguished from the one-directional loop by the absence of a head station or central station for each station is connected to all the other stations of the loop (by a multiconnection or meshed network). This is provided by two distinct fibers where the information elements flow in opposite directions. Furthermore, this type of loop provides for greater security because two backup fibers are used in addition to the two operational fibers.

The transfer of information elements in the loop is done according to the hierarchy of the SDH or SONET standard by means of a frame which is the STM4 or STM16 frame depending on the number of stations of the loop. Thus, as soon as the number of stations is greater than 4, the frame used is an STM16 frame working at 2.5 Gbit/s obtained by an electrical time-division multiplexing of 16 STM1 frames at 155 Mbit/s.

It is observed that when the number of stations is between 4 and 16, for example 7, the STM16 frame has 9 empty frames. It is therefore observed that the use of a frame at 2.5 Gbit/s is not optimized in every case. Furthermore, the instruments, especially the transceivers for a 2.5 Gbit/s transmission, are very costly.

With the recent introduction of parallel wavelength-division-multiplexed networks, namely wavelength-division-multiplexing, in these looped network architectures, an additional degree of flexibility has been obtained in enabling optical continuity to be maintained through the loop. This will be understood more clearly from the article by A. F. Elrefaie, *Multiwavelength Survivable Ring Network Architectures*, ICC 93, Geneva.

For wavelength-division-multiplexing (WDM), optical frequency add-and-drop multiplexers based on acousto-optical or Fabry-Perot filters as well as integrated optics waveguides have been used.

Reference could be made to the following articles in this field:

- M. Fukutoko et al., *Wavelength-division-multiplexing Add/Drop Multiplexer Employing A Novel Polarization Independent Acousto-Optical Tunable filter*, in ELECTRONICS LETTERS, Vol. 29, pp. 905–907, 1993,
- K. Oda et al., *An Optical EDM-Add/Drop Multiplexing Ring Network Utilizing Fiber Fabry-Perot Filters And Optical Circulators*, in IEEE Photonics Technology Letters, Vol. 5, No. 7, 1993,
- Y. Tachikawa et al., *Arrayed-Waveguide Grating Add/Drop Multiplexer With Loop-Back Optical Paths*, in Electronics Letters, Vol. 29, pp. 2133–2134, 1993.

Only one wavelength is used per station for transmission and reception and this wavelength is fixed once and for all. The principle of these different architectures relies on the elimination (or rejection) of one wavelength from each station during the information dropping or extraction operation in order to replace it during the information adding or insertion operation by another wavelength having the same value.

The other drawback related to the fact that one wavelength (this wavelength being fixed beforehand) is used per station is that it is not possible, with this technique, to share the bit rate among several stations.

Now, the Applicant has noted that if the traffic between two or more stations is low, then it would be worthwhile to share the data elements among these stations. More generally, it would be preferable to provide the transmission on such networks with greater flexibility. This flexibility may be obtained according to the invention by enabling a reconfiguration of loops according to traffic or according to the malfunctions that occur in the loops of the network.

SUMMARY OF THE INVENTION

An object of the present invention is a telecommunications network organized in reconfigurable wavelength-division-multiplexed optical loops.

The network according to the invention enables the sharing out of the information elements among two or more stations.

An object of the present invention more particularly is a telecommunications network organized in wavelength-division-multiplexed optical networks enabling the transfer of information elements in the form of synchronous frames or according to the SDH or SONET standard wherein an optical loop comprises a set of traffic stations in which each station has tunable reception means tuned as a function of the density of the traffic received by these stations so that two or more stations can receive data elements transmitted on one and the same wavelength by another station.

According to another characteristic, when two or more stations have low traffic, capable of being conveyed on one and the same frame, these stations have reception means tuned to one and the same wavelength, the stations then sharing the data elements of the frame.

According to anther characteristic, each station has transmission means, these means transmitting at a wavelength different from the wavelength to which the reception means are tuned.

According to another characteristic, the loop is one-directional, one of the stations being the network head station, this station then comprising means capable of transmitting on N wavelengths if N is the number of stations of the loop with which it communicates, this station having reception means capable of receiving on N wavelengths which are distinct from the transmission wavelengths.

The transmission and reception means of each station of the loop comprise an optical frequency add/drop multiplexer comprising a 2×2 optical coupler placed on a fiber, an optical filter that is designed to select the information and is connected to the coupler and an add laser also connected to the coupler.

According to another characteristic, the loop is a bi-directional loop, and each station has transmission means capable of transmitting on (N−1)/2 wavelengths if N is the number of stations in the loop and reception means capable of receiving on (N−2)/2 wavelengths distinct from the transmission wavelength.

The transmission and reception means comprise one optical frequency add/drop multiplexer per fiber, each multiplexer comprising an optical coupler, (N−1)/2 drop filters and (N−2)/2 add lasers giving a total of (N−1) filters and (N−1) lasers for the two fibers, N being the number of stations in the loop.

BRIEF DESCRIPTION OF THE DRAWINGS

Other particular advantages of the present invention shall appear from the following description, given by way of a non-restrictive example with reference to the appended drawings, of which:

FIGS. 1a and 1b are drawings respectively showing a one-directional loop and a bi-directional loop, FIG. 2a is a drawing showing the principle of a network R, FIG. 2b is the drawing of an embodiment of a one-directional loop B0 according to the invention, FIG. 3 is a graph of the wavelengths used, FIGS. 4a and 4b are drawings of a one-directional loop respectively without sharing of data elements and with sharing of data elements among stations, FIG. 5 is a drawing of an embodiment of a bi-directional loop according to the invention.

MORE DETAILED DESCRIPTION

FIG. 2a is a drawing showing the principle of a network R organized in a bi-directional optical loop B0 and in one-directional optical loops B1 to B3. The stations T are head stations for the loops B1, B2, B3. The other stations bear the reference S.

These loops are the type that shall be described with reference to FIGS. 2b and 5.

The one-directional wavelength-division-multiplexed loop shown in FIG. 2b is formed by a head station T and several stations S1 to S4 each comprising an optical frequency add/drop multiplexer MIE-FO. The head station or central station is formed by several lasers 1, 2, 3, 4 transmitting the information elements to be broadcast in the form of 155 Mbit/s STM1 frames or 622 Mbit/s STM4 frames (in the case of the SDH standard), at different wavelengths $\lambda 1$, $\lambda 2$, $\lambda 3$, $\lambda 4$, to the other stations which will filter each of these wavelengths.

In FIG. 2b, the second fiber F2 is used to secure the transmissions and the first fiber F1 is used to convey information from the station T to the other stations S1 to S4.

Each station has an optical frequency add/drop multiplexer (MIE-FO) M1, M2, M4 and quite standard electronic processing means E1–E4 that carry out the data processing.

The multiplexer of the station 1 is formed by a 2×2 optical coupler C1 placed on the fibers F1, F2, a laser to insert information elements into the received frame and a tunable optical filter D1 followed by a receiver P1 to extract the bit rate designed for the station. Each of these elements is of a known type. The filter is a filter of the Fabry-Perot type. The filter D1 is connected to an arm of the coupler C1 while the laser A1 is connected to the other arm.

The multiplexers of the other stations S1 to S4 are identical. The lasers of these stations transmit at wavelengths that could be distinct from one another as shown in FIG. 3 (wavelengths added to a network $\lambda'1$, $\lambda'2$–$\lambda'4$.

The station head T has reception means comprising as many drop optical filters D0 as there are transmitter stations placed on the loop. These means furthermore comprise as many detectors D0 as there are filters.

According to the invention, the optical filters are tunable. Their tuning could be modified for example by hand when the traffic at the two stations is low.

According to the invention, the multiplexer of a station does not reject the wavelength intended for the station. The wavelengths inserted are in a spectral window different from the one used at transmission (cf. FIG. 3). This enables one and the same wavelength to be shared by several stations.

The number of wavelengths on which transmission is made depends on the traffic to be put through as well as on the number of stations in the loop.

Indeed, if we take the case of 7 stations a, b, . . . , g, as shown in FIG. 4a, if the traffic to be put through is great and if each station has to extract one STM1, the capacity of the loop will be seven STM1. Using optical multiplexing, the central station will transmit on seven wavelengths at 155 Mbit/s, one per station, instead of sending one STM16, namely nine vacant STM1 (which is the case at present). On the contrary, if the traffic to be let through is low and if a capacity of 5 STM1 is enough for seven stations (FIG. 4b), the central station will transmit on only five wavelengths and two stations will share one STM1.

It is thus possible, according to the invention, to reduce the number of laser sources.

In the case of FIG. 4b, the optical filters contained in the stations c and e will both be tuned to $\lambda 4$ and therefore receive the same data. Thus, the loop may be reconfigured by tuning the optical filters in each station according to the density of the traffic intended for each station. The filters used are, for example, Fabry-Perot type filters.

A description shall now be given of a bi-directional optical loop according to the invention. Such a loop is shown in FIG. 5.

According to this second type of architecture, the traffic is conveyed on two fibers in opposite directions F1, F2. This configuration enables a full meshing among all the stations. Indeed, the station S1 communicates with the stations S2 and S3 on the fiber F1 through the wavelengths 12 and 13 and the wavelengths $\lambda 14$ and $\lambda 15$ used for the stations 4 and 5 will be conveyed on the other fiber F2. It is thus possible to re-utilize the same values of wavelengths ($\lambda 12=\lambda 14$ for example) since the conveying fiber is different.

The plan of the wavelengths for a five-station loop is shown in the Table 1 here below. According to this table, to provide for a complete meshing between the stations, four laser sources per station are needed, giving a total of 20 lasers. As in the first type of loop, each station uses two MIE-FO, M1, M11 each formed respectively by optical fibers D21, D31, D41 and D51 associated with a 2×2 coupler (C1, C2). In the case of FIG. 5, there are two filters per fiber.

If, on the contrary, the traffic to be let through between the stations is a low density traffic, the number of lasers per station may be reduced. Thus a single wavelength could be sent to two stations. The MIE-FO units in the two receiver stations will then each have one of their filters tuned to the same wavelength. The data will then be shared out and the number of lasers will be divided by two In the event of a break in the two operational fibers, two standby fibers are planned in order to replace them.

In FIG. 5, D21 and D31 represent the receivers connected to the fiber F2 by the coupler C2. D41 and D51 represent the receivers connected to the fiber F1 by the coupler C1. A12 and A13 are connected to the fiber F1 by the coupler C1. A14 and A15 are connected to the fiber F2 by the coupler C2. The reception means of the other stations are connected to the couplers C1 and C2 placed on the fibers F1 and F2 in the same way as described with reference to the station S1. The transmission means of the other stations are connected to the couplers C1, C2 placed on the fibers F1 and F2 also in the same way as described with reference to the station S1.

TABLE 1

| $\lambda_{ij}$: TRANS-MITTER | RECEIVER STATIONS | | | | |
| --- | --- | --- | --- | --- | --- |
| | station 1 | station 2 | station 3 | station 4 | station 5 |
| station 1 | | $\lambda\,12$ | $\lambda\,13$ | $\lambda\,14$ | $\lambda\,15$ |
| station 2 | $\lambda\,21$ | | $\lambda\,23$ | $\lambda\,24$ | $\lambda\,25$ |
| station 3 | $\lambda\,31$ | $\lambda\,32$ | | $\lambda\,34$ | $\lambda\,35$ |
| station 4 | $\lambda\,41$ | $\lambda\,42$ | $\lambda\,43$ | | $\lambda\,45$ |
| station 5 | $\lambda\,51$ | $\lambda\,52$ | $\lambda\,53$ | $\lambda\,54$ | |

$\lambda_{ij}$: i for transmitter station; j for the receiver station.

What is claimed is:

1. A telecommunications network organized in wavelength-division-multiplexed optical networks enabling the transfer of information elements, comprising:
   an optical loop;
   a plurality of stations disposed at points along the optical loop, each station including
   a tunable optical frequency reception device, the tunable reception device being tuned to a reception frequency,
   an optical transmission device, the optical transmission device being tuned to a transmission frequency which is different than the reception frequency of the same station,
   and wherein the tunable optical receivers of at least two stations are tuned as a function of the density traffic between the plurality of stations, the tunable optical receivers of the at least two stations being tuned to the same reception frequency and the at least two stations sharing data elements of a same frame, and the at least two stations being low traffic stations based on the density of the traffic to the at least two stations.

2. A telecommunications network according to claim 1, wherein the loop is a bi-directional loop,
   wherein the transmission device of station is capable of transmitting on only M transmission frequencies, M being less than N–b 1, N being the number of stations in the loop, and
   wherein the reception device of each station is capable of receiving on only M reception frequencies which are all distinct from the M transmission frequencies.

3. A telecommunications network according to claim 2, wherein
   the tunable reception device of each station comprises M drop filters, each drop filter being coupled to one of two optical frequency add/drop multiplexers, each multiplexer comprising an optical coupler, and wherein
   the tunable transmission device of each station comprises M add lasers, each add laser also being coupled to one of two optical frequency add/drop multiplexers.

4. A telecommunications network according to claim 1,
   wherein the loop is one-directional,
   wherein one of the plurality of stations is a network head station,
   wherein the transmission device of the network head station is capable of transmitting on only M transmission frequencies, M being less than N–1, N being the number of stations of the loop, and
   wherein the reception device of the network head station is capable of receiving on only M reception frequencies which are all distinct from the M transmission frequencies.

5. A telecommunications network according to claim 4, wherein
   the reception device of each station comprises an optical filter that is designed to select the information, the optical filter being connected to an optical frequency add/drop multiplexer, and the optical frequency add/drop multiplexer comprising a 2×2 optical coupler placed on a fiber, and wherein
   the transmission device of each station comprises an add laser, the add laser also being connected to the coupler.

6. A telecommunications network according to claim 4, further comprising a plurality of additional head stations, all of the head stations being organized in a network formed of an optical loop.

7. A telecommunications network according to claim 1, wherein the tunable reception device of each station comprises a tunable optical filter coupled to a receiver.

8. A telecommunications network according to claim 7, wherein the data elements are transmitted using synchronous communication.

9. A method of communicating on a telecommunications network, the method comprising the steps of:
   providing the telecommunications network comprising a plurality of stations disposed at points along the optical loop, each station being provided with a tunable optical reception device and an optical transmission device;
   configuring the telecommunications network, the configuring step including the steps of
   setting a first reception frequency and a first transmission frequency for a first station, the first station being one of the plurality of stations, and the first reception frequency being different than the first transmission frequency,
   setting a second reception frequency and a second transmission frequency for a second station, the second station being one of the plurality of stations, and the second reception frequency being different than the second transmission frequency,
   setting a reception frequency and a transmission frequency for each of the remaining plurality of stations, the reception frequency of each station being different than the transmission frequency of the same station;

reconfiguring the telecommunications network based on the density of traffic to each of the plurality of stations, the reconfiguring step including the step of tuning the tunable optical reception devices of the first and second stations to a same reception frequency, the first and second stations being low traffic stations; and sharing data elements of a same frame, the sharing step being performed by the first and second stations, the data elements being transmitted to the first and second stations on the same frequency.

10. A method according to claim 9, wherein the optical loop is a one-directional loop, wherein there are N stations and wherein one of the N plurality of stations is a head station, and further comprising the step of transmitting data elements on only M different transmission frequencies, M being less than N−1, the transmitting step being performed by the head station.

11. A method according to claim 9, wherein the optical loop is a one-directional loop, wherein there are N stations and wherein one of the N plurality of stations is a head station, and further comprising the step of receiving data elements on only M different reception frequencies, M being less than N−1, the receiving step being performed by the head station.

12. A method according to claim 11, further comprising the step of linking the head station to a plurality of additional head stations, all of the head stations being linked in a network formed of an optical loop.

13. A method according to claim 9, wherein the optical loop is a bi-directional loop, wherein there are N stations, and further comprising the step of transmitting data elements on only M different transmission frequencies, M being less than N−1.

14. A method according to claim 9, wherein the optical loop is a bi-directional loop, wherein there are N stations, and further comprising the step of receiving data elements on only M different reception frequencies, M being less than N−1.

15. A wavelength-division-multiplexed optical telecommunications network enabling the transfer of information elements, the network comprising:

an optical loop;

a plurality of stations disposed at points along the optical loop, including a first low traffic station, the first station further including
a first tunable optical reception device comprising a first tunable optical filter coupled to a first receiver, the first tunable optical reception device being tuned to a first reception frequency as a function of the density of the traffic between the plurality of stations,
a first optical transmission device comprising a laser, the optical transmission device transmitting being tuned to a first transmission frequency which is always different than the first reception frequency,
a first optical frequency add/drop multiplexer comprising a 2×2 optical coupler;

a second low traffic station, the second station further including
a second tunable optical reception device comprising a second tunable optical filter coupled to a second receiver, the second tunable optical reception device being tuned to a second reception frequency as a function of the density of the traffic between the plurality of stations, the second reception frequency being the same as the first reception frequency, and
a second optical transmission device, the optical transmission device transmitting being tuned to a second transmission frequency which is always different than the second reception frequency,
a second optical frequency add/drop multiplexer comprising a 2×2 optical coupler;

and wherein the first and second low traffic stations receive and share data elements of a same frame on the same reception frequency.

16. A telecommunications network according to claim 15, wherein the loop is one-directional, wherein one of the plurality of stations is a network head station, wherein the transmission device of the network head station is capable of transmitting on only M transmission frequencies, M being less than N−1, N being the number of stations of the loop, and wherein the reception device of the network head station is capable of receiving on only M reception frequencies which are all distinct from the M transmission frequencies.

17. A telecommunications network according to claim 16, wherein the transmission device of each of the plurality of stations comprises an add laser.

18. A telecommunications network according to claim 15, wherein the loop is a bi-directional loop, wherein the transmission device of station is capable of transmitting on only M transmission frequencies, M being less than N−1, N being the number of stations in the loop, and wherein the reception device of each of the plurality of stations is capable of receiving on only M reception frequencies which are all distinct from the M transmission frequencies.

19. A telecommunications network according to claim 18, wherein the transmission device of each of the plurality of stations comprises M add lasers.

* * * * *